(12) United States Patent
Johnson et al.

(10) Patent No.: US 12,470,594 B1
(45) Date of Patent: Nov. 11, 2025

(54) SYSTEMS AND METHODS FOR BLOCKING, DETECTING AND RESPONDING TO CYBER ATTACKS IN PHYSICALLY CONTROLLED DISTRIBUTED SYSTEMS

(71) Applicant: National Technology & Engineering Solutions of Sandia, LLC, Albuquerque, NM (US)

(72) Inventors: Jay T. Johnson, Albuquerque, NM (US); Christian B. Jones, Albuquerque, NM (US); Adrian R. Chavez, Davis, CA (US); Shamina S. Hossain-McKenzie, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 79 days.

(21) Appl. No.: 18/588,646

(22) Filed: Feb. 27, 2024

Related U.S. Application Data (60) Provisional application No. 63/448,748, filed on Feb. 28, 2023.

(51) Int. Cl.
  *H04L 9/40* (2022.01)
(52) U.S. Cl.
  CPC ........ *H04L 63/1458* (2013.01); *H04L 63/145* (2013.01)
(58) Field of Classification Search
  CPC .................. H04L 63/1458; H04L 63/145
  See application file for complete search history.

(56) References Cited

U.S. PATENT DOCUMENTS

| | | | |
|---|---|---|---|
| 12,107,869 B1* | 10/2024 | Kannan | H04L 63/20 |
| 12,120,146 B1* | 10/2024 | Shakhzadyan | H04L 63/1408 |
| 12,126,643 B1* | 10/2024 | Skarphedinsson | H04L 63/1441 |
| 12,309,185 B1* | 5/2025 | Skarphedinsson | H04L 67/535 |
| 12,309,188 B1* | 5/2025 | Al Ghazo | H04L 63/1425 |
| 12,323,449 B1* | 6/2025 | Graves | H04L 63/10 |
| 12,348,545 B1* | 7/2025 | Parikh | G06F 16/9535 |
| 2021/0297427 A1* | 9/2021 | Narula | G06F 3/048 |
| 2023/0021214 A1* | 1/2023 | Lehmer | H02S 50/10 |
| 2023/0319071 A1* | 10/2023 | Durbin | H04L 63/1466 726/23 |
| 2023/0379353 A1* | 11/2023 | Fichter | H04L 63/0442 |
| 2024/0031395 A1* | 1/2024 | Kiss | H04L 41/22 |
| 2024/0411898 A1* | 12/2024 | Lin | G06N 5/04 |
| 2024/0422178 A1* | 12/2024 | Hariri | H04L 41/22 |

(Continued)

*Primary Examiner* — Stephen T Gundry
(74) *Attorney, Agent, or Firm* — Merle W. Richman (57) ABSTRACT

Systems and methods that provide Security Orchestration, Automation, and Response (SOAR) technologies that equip cyber-defenders with new capabilities to autonomously respond to network and host-based system alerts, threat hunting results, and cyber intelligence data streams. Systems and methods provide a novel SOAR approach for networked systems where such networked systems include PCDS systems such as DERs. System may ingest data from multiple Intrusion Detection Systems (IDSs) to quickly block attacks and revert PCDS systems to known good states via a collection of IDS technologies including Bump-in-the-Wire (BITW) devices which incorporate physical and cyber data to detect abnormal and potential malicious behaviors.

18 Claims, 10 Drawing Sheets

(56) References Cited

U.S. PATENT DOCUMENTS

| | | | |
|---|---|---|---|
| 2025/0007945 A1* | 1/2025 | Rieger | H04L 63/1416 |
| 2025/0086280 A1* | 3/2025 | Murphy | H04L 63/1441 |
| 2025/0088520 A1* | 3/2025 | Gerow | H04L 63/1416 |
| 2025/0150467 A1* | 5/2025 | Birsan | G06F 21/577 |
| 2025/0156303 A1* | 5/2025 | Stevens | G06F 11/3612 |
| 2025/0175456 A1* | 5/2025 | Crabtree | G06N 7/01 |
| 2025/0181749 A1* | 6/2025 | Thompson | G06F 21/6218 |
| 2025/0190185 A1* | 6/2025 | Hanson | G06F 8/36 |

* cited by examiner

SYSTEMS AND METHODS FOR BLOCKING, DETECTING AND RESPONDING TO CYBER ATTACKS IN PHYSICALLY CONTROLLED DISTRIBUTED SYSTEMS

CROSS-REFERENCE TO RELATED APPLICATION

This application claims priority to U.S. Provisional Application 63/448,748, filed Feb. 28, 2023, the entirety of which is hereby incorporated by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to protecting distributed physical systems having cyber connections.

BACKGROUND

Physically controlled distributed systems (PCDS) such as Distributed Energy Resources (DER) may have cyber connections thereto (such as via Internet and local network) to enable control, updates, status inquires, and other features/ usage of the systems. When issues occur in distributed systems (whether caused by environmental, systems errors, or bad actors) the issues may cause operational issues within the system(s). Monitoring data and control functionality in PCDS such as DER may improve site maintenance, prognostics, and interrelated-systems operations (such as grid operations in DERs). Due to the cyber connections, such PCDS communications may present attack vectors which could lead to systems impacts. Adversarial capabilities continually grow. To avoid potential catastrophic consequences, intelligent intrusion detection and remediation systems need to consider both physical and cyber features.

For Distributed Energy Resources (DER), the risk of adverse effects on coupled electric grids is well known particularly when the attacker modified DER physically controllable settings. Preventing unauthorized access to internet connected PCDS is difficult as adversaries continuously search for new methods to gain access to such networks and the underlying equipment/systems. Historically, hundreds of organizations using PCDS have been compromised and intrusion dwell times (response and correction times) may average weeks. Accordingly, better intrusion detection and mitigation systems are necessary to protect PCDS. Other features and advantages will be made apparent from the present specification. The teachings disclosed extend to those embodiments that fall within the scope of the claims, regardless of whether they accomplish one or more of the aforementioned needs.

SUMMARY

The present disclosure is directed to systems and methods that provide New Security Orchestration, Automation, and Response (SOAR) technologies that equip cyber-defenders with new capabilities to autonomously respond to network and host-based system alerts, threat hunting results, and cyber intelligence data streams. The systems and methods provide a novel SOAR approach for networked systems. The networked systems include PCDS systems such as DER. The invention may ingest data from multiple Intrusion Detection Systems (IDSs) to quickly block attacks and revert PCDS systems to known good states. The systems and methods use a collection of IDS technologies including Bump-in-the-Wire (BITW) devices which incorporate physical and cyber data to detect abnormal and potential malicious behaviors. Multiple SOAR playbooks then may use the IDS data streams to automatically defend the underlying PCDS systems. Laboratory testing of the SOAR systems for PCDS showed detection and response times under 30 seconds for adversary reconnaissance, denial-of-service attacks, malicious Modbus commands, brute force logins, and machine-in-the-middle attacks.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Systems that produce, control, and regulate physical elements and energy such as chemical plants, oil pipelines, electrical energy grids, manufacturing and processing plants may be distributed and physically controllable-termed Physically controlled distributed systems (PCDS) hereafter. The physical control may be local or also distributed via communication networks or "cyber" connected. The PCDS cyber connections therebetween (such as via Internet) may enable control, updates, status inquires, and other features/ usage of the PCDS. Bad actors may attempt to employ cyber connections to affect operations of PCDS. To limit, control, and ameliorate such attempts embodiments of the present invention employ systems to detect, prevent, and maintain operational safety of such PCDS.

Figure 1A:
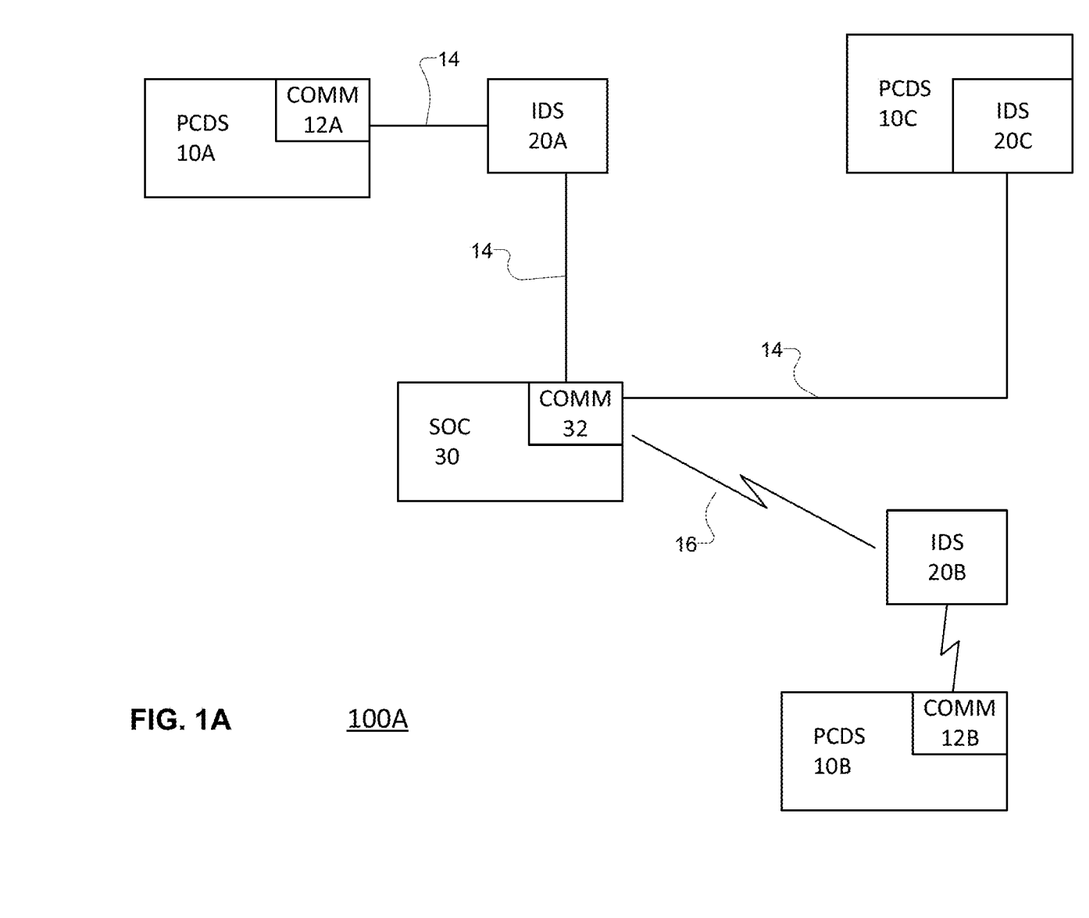
FIG. 1A is a simplified block diagram of SOAR-PCDS architecture according to various embodiments.

FIG. 1A is a simplified block diagram of SOAR-PCDS architecture 100A according to various embodiments. As shown in FIG. 1A, architecture 100A may include a security operation center (SOC) 30 communicating with several PCDS 10A-10C via wired or wireless connections. Intrusion detection systems (IDS) 20A-20C may monitor/ingest communication data to/from a PCDS 10A-10C. In an embodiment, an IDS 20A may be coupled on a communication link between a PCDS 10A (bump in the wire) BITW or wireless communication (IDS 20B) and be part of PCDS 10C. A PCDS 10 may include communication modules 12 that may part of a PCDS 10 or coupled thereto. The communication modules 12 may enable communication of signals using one or more communication protocols and via wired or wireless signals including terrestrial or satellite based (or combinations thereof). In an embodiment, an IDS 20A-20C may collect data for one or more PCDS 10A-10C. In an embodiment, an IDS 20A-20C may also analyze the data in real-time and provide real-time processed data to a SOC 30. In an embodiment, an IDS 20A-20C may collect network traffic via various sniffers including Snort and Zeek, conduct traffic analysis, deep packet inspection and create signatures on the traffic to detect and block attacks via the SOC 30. In an embodiment, a SOC 30 may block/drop malicious packets, such as to prevent a denial-of-service attack. A SOC 30 may also restore control operations (physical side) to defaults or backups.

Architecture 100A may provide Security Orchestration, Automation, and Response (SOAR) technologies using automated response playbooks fed with one or more data streams via IDS 20A-20C to defend such architecture 100A and assets based on pre-programmed rules. SOAR operating in a SOC 30 may quickly neutralize threats through automated responses. To be effective in an embodiment, SOAR may rely on the data provided by the other systems via the IDS 20A-20C. Deployment of SOAR technologies represents a significant step in the maturation of renewable and distributed Security Operation Centers (SOCs). For example, in SOAR for DER applications (SOAR4DER) over time DER Management System (DERMS) security practitioners may be able to employ the new and useful systems and methods as disclosed herein to provide Security Orchestration, Automation, and Response (SOAR) technologies using automated response playbooks fed with one or more data streams to defend a network and assets based on pre-programmed rules.

Over time DER Management System (DERMS) security practitioners may layer new technologies into their integrated SOCs to expand their detection and response capabilities. SOAR tool efficacy may be limited by the detection and threat data they ingest via IDS 20A-20C and their practical utility may be limited by the response functions in their arsenal. The construction and expansion of DERMS SOC systems includes transitioning from simple perimeter defenses to centralized, analytical data fusion tools to predictive, automated, and threat-based strategies. This transition adds new defense-in-depth capabilities to the SOC 30. Information in more mature SOC systems 30 may be leveraged by SOAR systems to quickly execute precise mitigations in an embodiment.

Figure 1B:
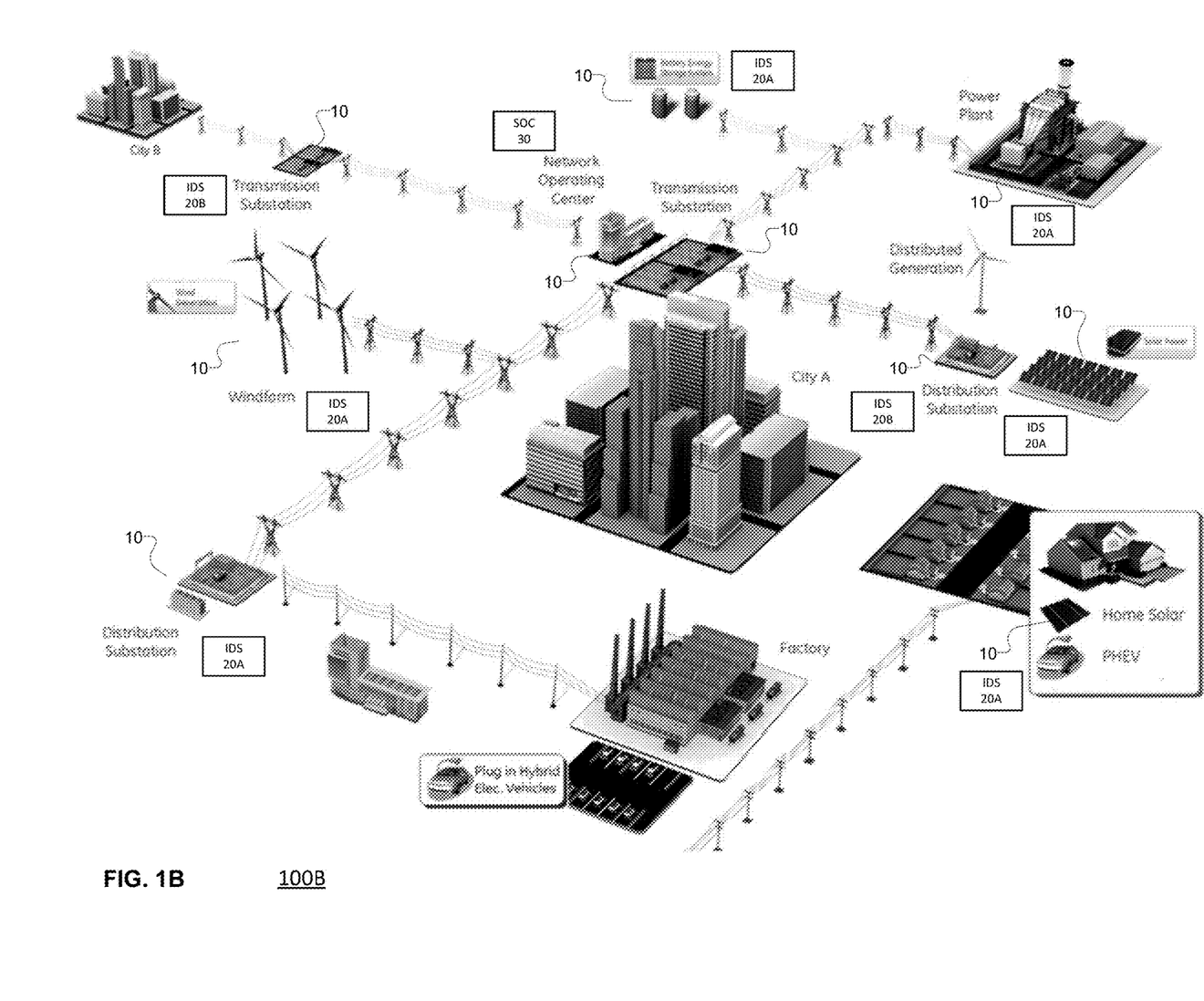
FIG. 1B is a simplified diagram of SOAR-PCDS architecture for energy distribution (grid) according to various embodiments.

FIG. 1B is a simplified diagram of SOAR-PCDS architecture 100B for energy distribution (grid) according to various embodiments. As shown in FIG. 1B, architecture 100B may include an SOC 30 (network operation center), several IDS 20A, and several PCDS 10 including a transmission substation, distribution substations, a power generation plant 10, a home-based solar system 10, a solar power plant 10, a battery energy storage system 10, and a transmission substation 10. IDS 20A may be operatively coupled to, between, or within one or more PCDS 10 of the grid architecture 100B.

Figure 1C:
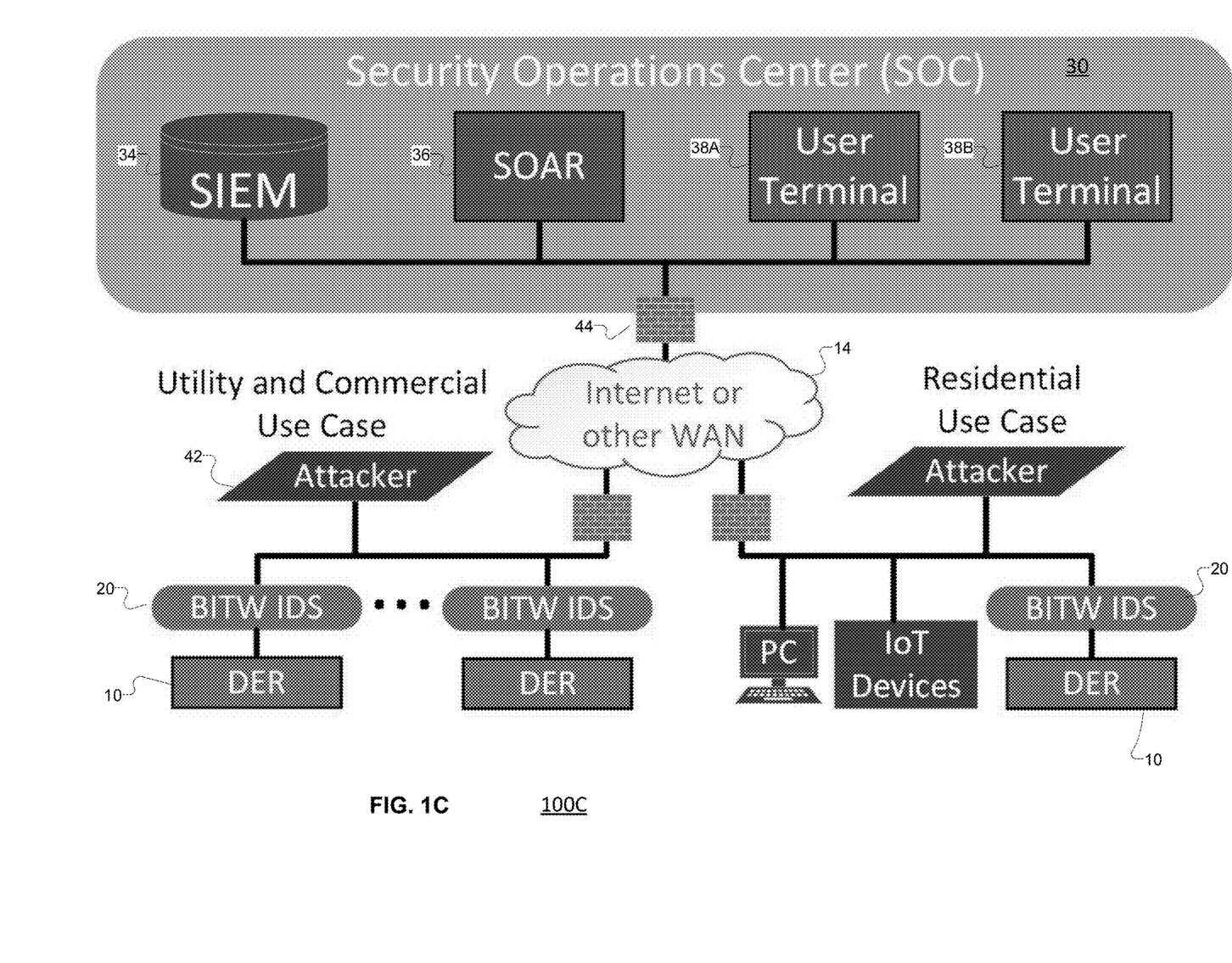
FIG. 1C is a simplified block diagram of SOAR4DER architecture according to various embodiments.

FIG. 1C is a simplified block diagram of SOAR architecture for DER 100C (termed SOAR4DER) according to various embodiments. As shown in FIG. 1C, architecture 100C includes a SOC 30, DER 10, BITW IDS 20, network 14, attacker systems 42, and firewalls 44. DER 10 may be coupled to a SOC 30 via internet 14. BITW IDS 20 may receive and process data communicated with a DER 10 and provide such data and processed data to the SOC 30. The SOC 30 may include a security information and event management (SIEM) database 34, a security orchestration automation and response (SOAR) system 36 and one or more SOC user terminals 38A-38B. The combination of the IDS 20 with a SOAR system 36 in embodiment enables a user of a SOC 30 to streamline case management, automation, information sharing, and threat intelligence management for incident response processes.

Architectures 100A-100C may enable SOC users to create Python or other scripts to automate tasks that are then layered into playbooks for SOAR system 36 with features for threat feeds, incident alerts, etc. in order to provide unified situational awareness for all stakeholders (SOC analysts, IT admins, and Chief Security Officer) of architecture 100A-100C. Architectures 100A-100C using automated SOAR 36 playbooks may be able to respond to security incidents/disturbances when predictable events, i.e., for which indicators of compromise or signatures are known and response actions have been preprogrammed. It is noted that unpredictable disturbances and/or zero-day exploits with no defined signatures, playbook responses may not suffice. In those situations, human analysis will be required. However, if most alerts are processed automatically by SOAR 36, SOC 30 personnel may be able to focus their attention on these unknown cases.

Figure 2:
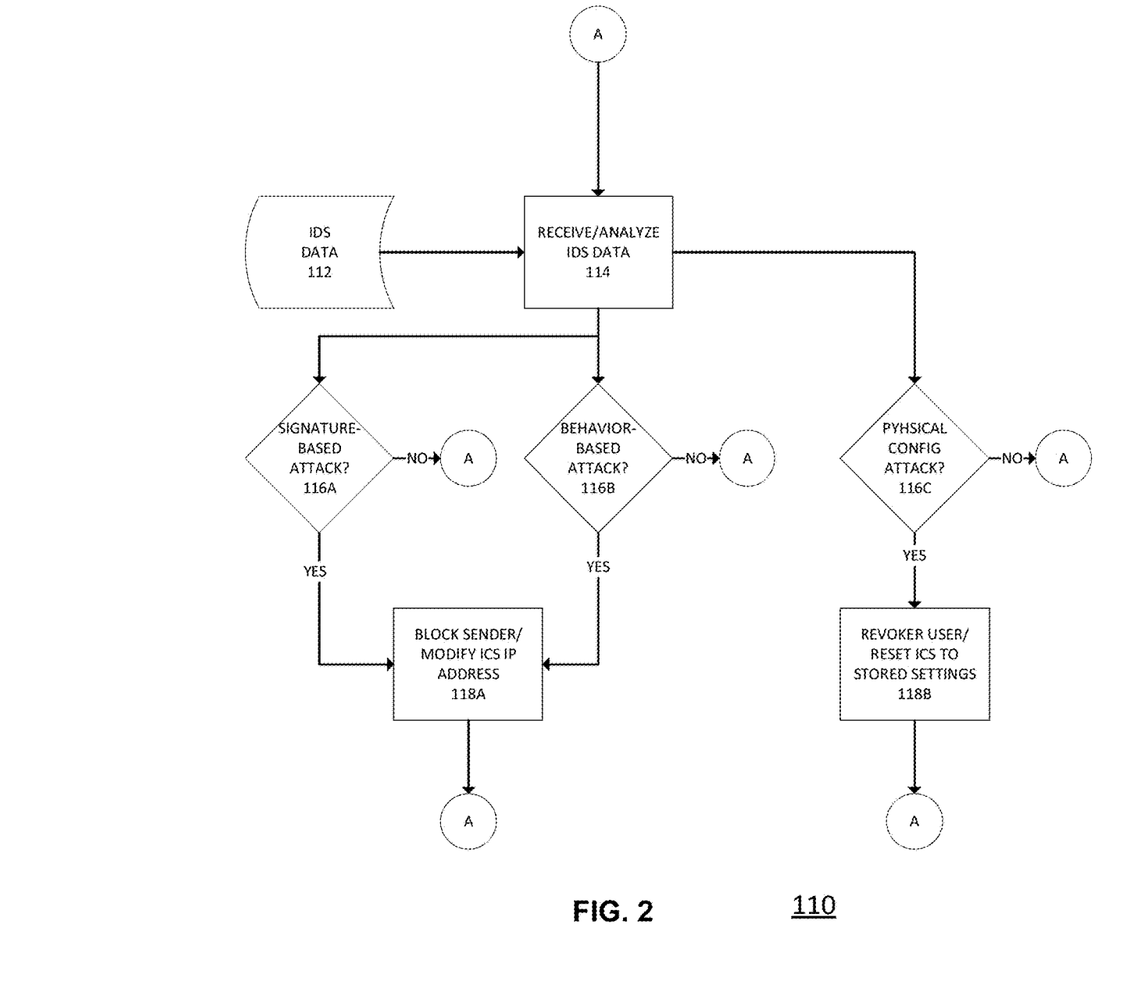
FIG. 2 is a block diagram of an algorithm for SOAR-PCDS according to various embodiments.

FIG. 2 is a block diagram of an algorithm 110 for SOAR-PCDS according to various embodiments. As shown in FIG. 2, a SOAR system 36 may receive and analyze IDS data 112 including logs/analysis (activity 114). Such analysis may determine the IDS data includes signature based or behavior based attacks (activities 116A, 116B) and mitigate the attacks (activity 118A). Such analysis may also determine that IDS data indicates the data represents/includes a physical configuration attack (activity 116C) such as by an inside user and mitigate the attack by revoking the insider user and resetting operational parameters to a known good start in an embodiment (activity 118B).

Behavior-based analyses may be supported within the SOAR 36 platforms to ensure anomalies are detected when signatures are not available and to provide situational awareness into data patterns. Furthermore, for PCDS 10, both cyber and physical data are processed in architecture 100A-100C. For example, DER systems are becoming increasingly cyber-physical with the use of smart technologies, automated grid-support functions, new communication capabilities, and use of third-party software. In an embodiment, when a cyberattack occurs, physical data along with cyber data may be monitored using IDSs 20. Such hybrid approach that leverages both cyber and physical data may detect a broader range of attacks (e.g., insider threat), prevent physical system consequences, and understand impact propagation.

Architecture 100C presents a SOAR solution that uses alerts from signature and behavior-based IDSs deployed on bump-in-the-wire (BITW) devices in front of DER equipment. In an embodiment such as for utility-scale DER and commercial installations, there may be multiple DER devices on site that are individually monitored via an IDS 20. For the residential DER, a BITW IDS 20 could be on the homeowner Local Area Network (LAN), on an isolated virtual LAN, or connected via a cellular or RF mesh backhaul to the DERMS. The BITW IDS technology could be installed elsewhere in the network, in the DER housing, or directly on the DER operating system. A benefit of placing IDS 20 upstream of DER 10 is reduced cost and complexity. The benefit of placing IDS 20 at each DER 10 is increasing adversary detection likelihood.

In an embodiment, a BITW IDS 20 may include multiple detection technologies. In an embodiment, signature-based intrusion detection may be designed to identify packet manipulation, Address Resolution Protocol (ARP) spoofing, and other known attack types. In an embodiment, behavior-based intrusion detection analysis may identify adversary reconnaissance, denial-of-service attempts, and other previously unknown actions using one or more Machine Learning (ML) algorithms to detect both known and unknown patterns through inference. When an attack is detected, an IDS 20 may log pertinent information and reports it to the SIEM database for storage therein. Then, the SOAR system 36 may implement mitigation measures to stop an attack and return services back to an operational state.

Figure 1D:
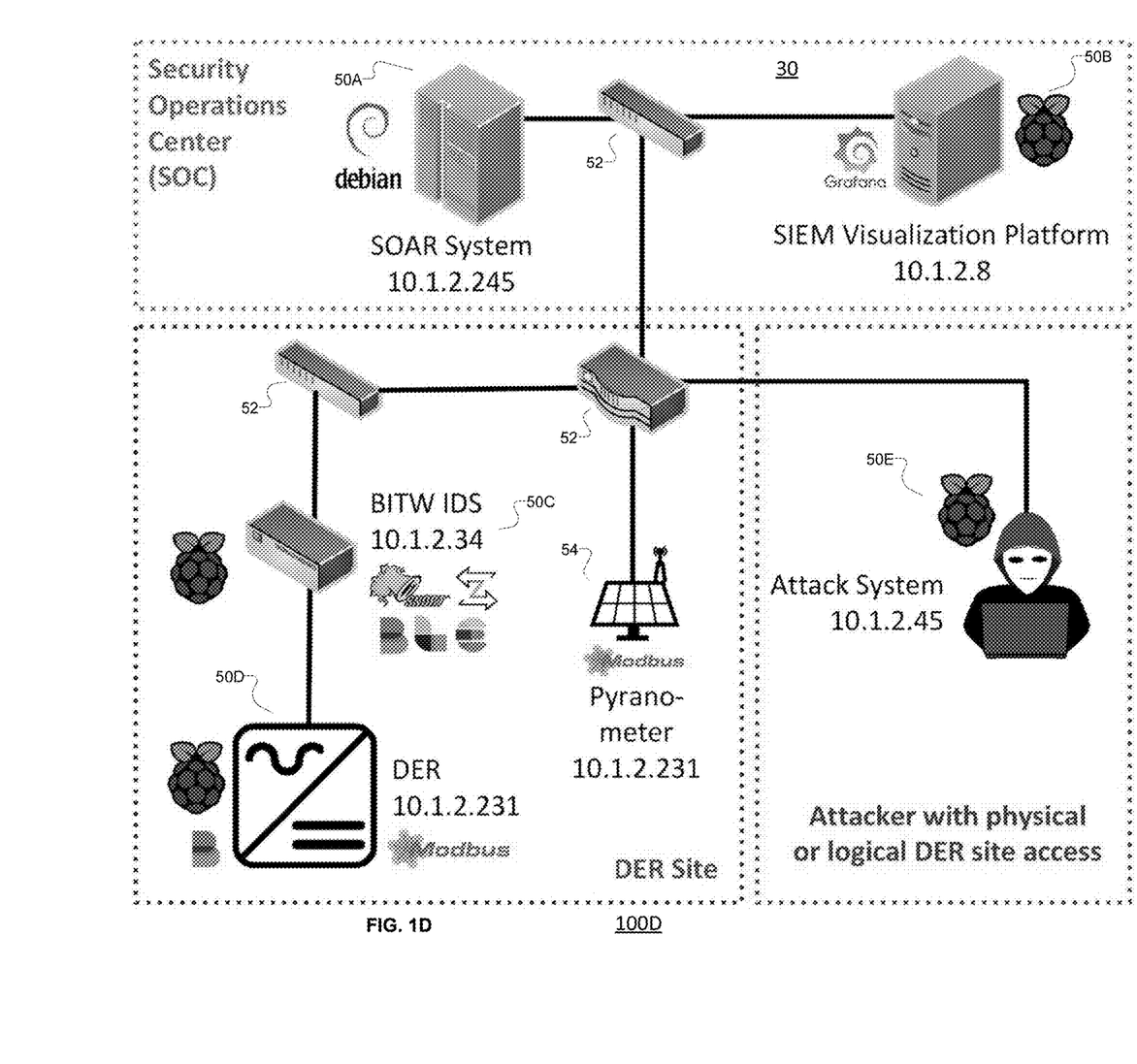
FIG. 1D is simplified diagram of an emulation/simulation platform of SOAR4DER architecture shown in FIG. 1C according to various embodiments.

An emulation/simulation system and methodology are presented to show application of embodiments of the present invention to a particular PCDS architecture, one including DER and its operational advantages. FIG. 1D is a simplified diagram of an emulation platform 100D of SOAR4DER architecture 100C shown in FIG. 1C according to various embodiments. As shown in FIG. 1D, the emulation/simulation platform 100D includes several computer systems 50A-50E that emulate/simulate components of architecture 100C along with routers 52 and physical data generation system 54. The computer systems 50A-50E may emulate or simulate a SOAR system 50A, SIEM database and visualization platform 50B, BITW IDS 50C, DER 50D, and attacker system 50E. In an embodiment, one or more of the computer systems 50A-50E may be single board computers such as raspberry Pi based single board computers.

In an embodiment, the DER simulator/emulator 50D runs AC and DC power simulations on a Raspberry Pi 4 with prerecorded 1-second solar irradiance, grid voltage, and grid frequency profiles. The DER simulator 50D may include multiple IEEE 1547-compliant interoperability interfaces. In an embodiment, the DER simulator 50D may be configured to represent a 100 KW utility-scale PV inverter. As shown, there is a simulated pyranometer (solar irradiance meter) 54 for collected plane-of-array solar irradiance. In an embodiment, the BITW IDS emulator 50C is hosted on a Raspberry Pi 4 with 4 GB of RAM, a 16 GB SD card, and additional flash memory to hold an Elasticsearch database.

Figure 3A:
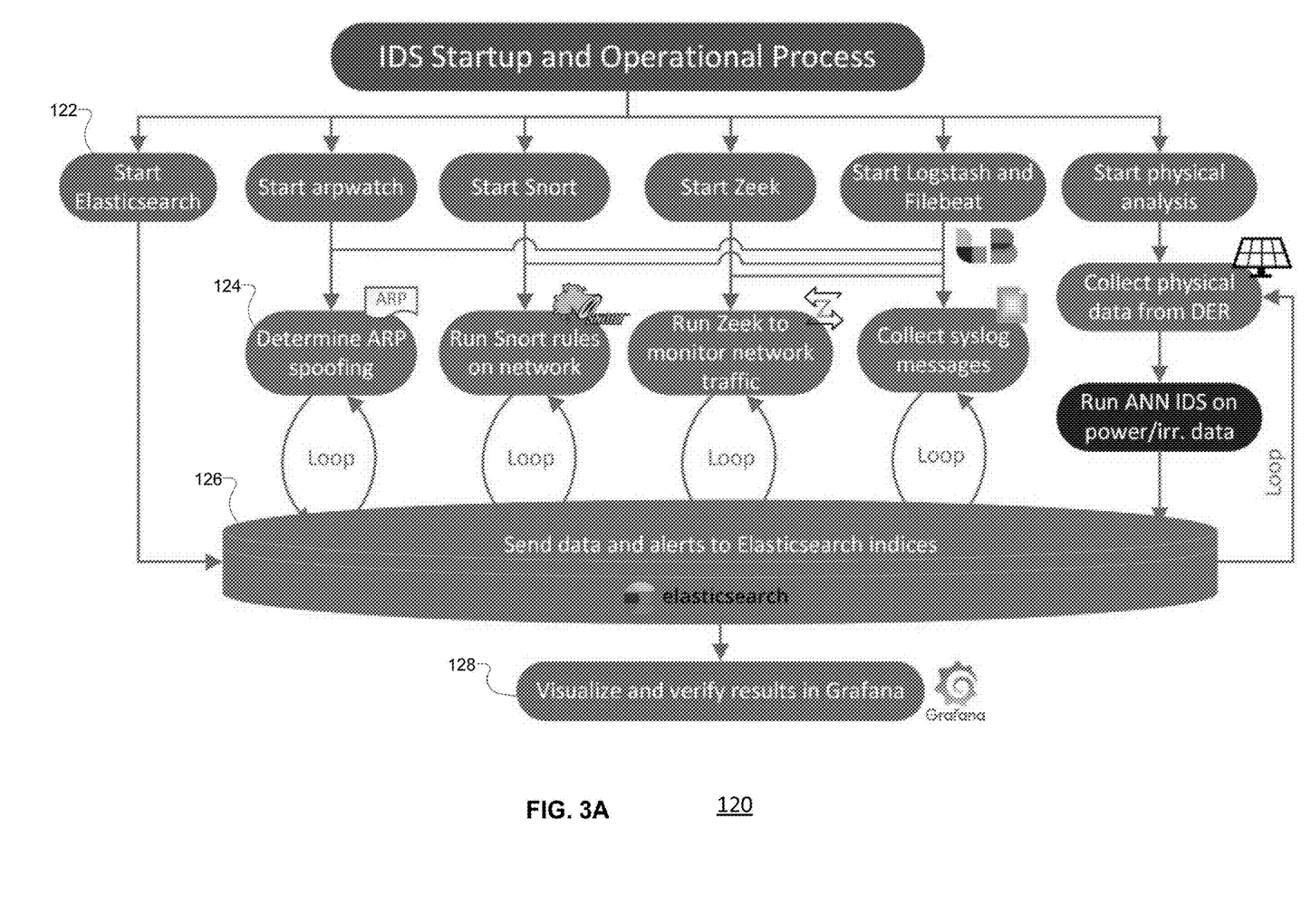
FIG. 3A is a block diagram of an algorithm for an IDS of a SOAR4DER according to various embodiments.

In an embodiment, an IDS 20, 50C may host/run several programs, including Zeek, Snort, Filebeat, and Logstash, to capture and analyze traffic of the DER simulator 50D, shown in the startup and operations shown in FIG. 3A. To begin an IDS system 20 or emulator 50C, Elasticsearch may be initiated (122 in FIG. 3A) with the indices for storing log and alert data. Zeek may be used to detect signature and behavioral-based anomalies. Zeek may be employed to collect and interpret network traffic to create compact, high-fidelity transaction logs, file content, and other customized output. In an embodiment for IDS 20 applications, Zeek may have a Modbus library to track Modbus sessions. For example, when a connection is made using the Modbus protocol on port 502, sessions may be automatically tracked in a file named modbus.log.

Snort is an open-source packet sniffer, packet logger, and signature-based intrusion prevention system (IPS) that alarms on unique signatures of known malware or traffic that may indicate an attack. In an embodiment, a series of rules may be used to define malicious network activity signatures. IDS 20 specific rules called QuickDraw, compiled by Digital Bond, may be included to alarm on Modbus events such as attempted denial of service (DOS) attacks, malformed Modbus packets, and Modbus packets that have incorrect source and destination internet protocol (IP) addresses.

Filebeat may be employed in an IDS 20 to monitor, collect, and forward logs specified by a user as they are written to disk in real-time. In the event that Filebeat is interrupted, it will keep track of the most recent logs it already reviewed and will only forward new logs that have not been processed. Additionally, Filebeat provides users with the ability to tag logs so they can be sorted and grouped with user-specified strings. Filebeat communicates alerts to Logstash for further processing and parsing. Logstash collects logs from a variety of sources, parses that data according to schemas defined by the user, and seamlessly forwards the transformed data to a database specified by the user. Filebeat and Logstash work together to monitor logs specified by the user to efficiently store them in a centralized system for analysis. Filebeat and Logstash operate as network services and can easily be deployed across endpoints on a network that monitors both host and network logs.

Elasticsearch is a database that has the ability to interoperate with a number of log collectors (such as Filebeat and Logstash) and provide data to visually display those alerts (126-FIG. 3A). Visual front-end systems including Grafana and Kibana may be used to display network health and events detected in real time for situational awareness (128-FIG. 3A). In an embodiment, Grafana may be used as the SIEM visualization software and run on another Raspberry Pi computer (emulation/simulation system 50B).

In an embodiment, the attack system 50E is emulated/simulated via a Raspberry Pi Operating System, Raspbian, and with several tools to launch representative attacks on the DER 50D. The attacks include use of a network mapper, nmap to perform reconnaissance of the DER 50D, hping3 for its ability to generate TCP, UDP, ICMP and RAW-IP packet floods for DoS (denial of service) simulations, custom Python code using PyModbus and PySunSpec2 packages to communicate Modbus to the DER 50D, Hydra for brute force username and password attacks against FTP, SSH, Telnet, and other protocols, and Ettercap for several features for machine-in-the-middle attacks. The attack system 50E further included an attack harness with a collection of bash scripts to launch one or more automated attacks.

In the simulation within the SOC 30, a SIEM visualization tool was created using Grafana to monitor physical data of the DER system 50D and inspect alerts, logs, and other IDS 50C data. For the purposes of quantifying the response times for the SOAR demonstration, the attack system 50E and the SOAR system 50A log to Elasticsearch using the ISO 8601 timestamp, rounded to the nearest second, from the attack computer 50E when the attack started and stopped, malicious activities detected by the SOAR system 50A, and when the SOAR system 50A completed the response actions. An example of the physical DER data and the attack results 140 is shown in FIG. 4.

Figure 4:
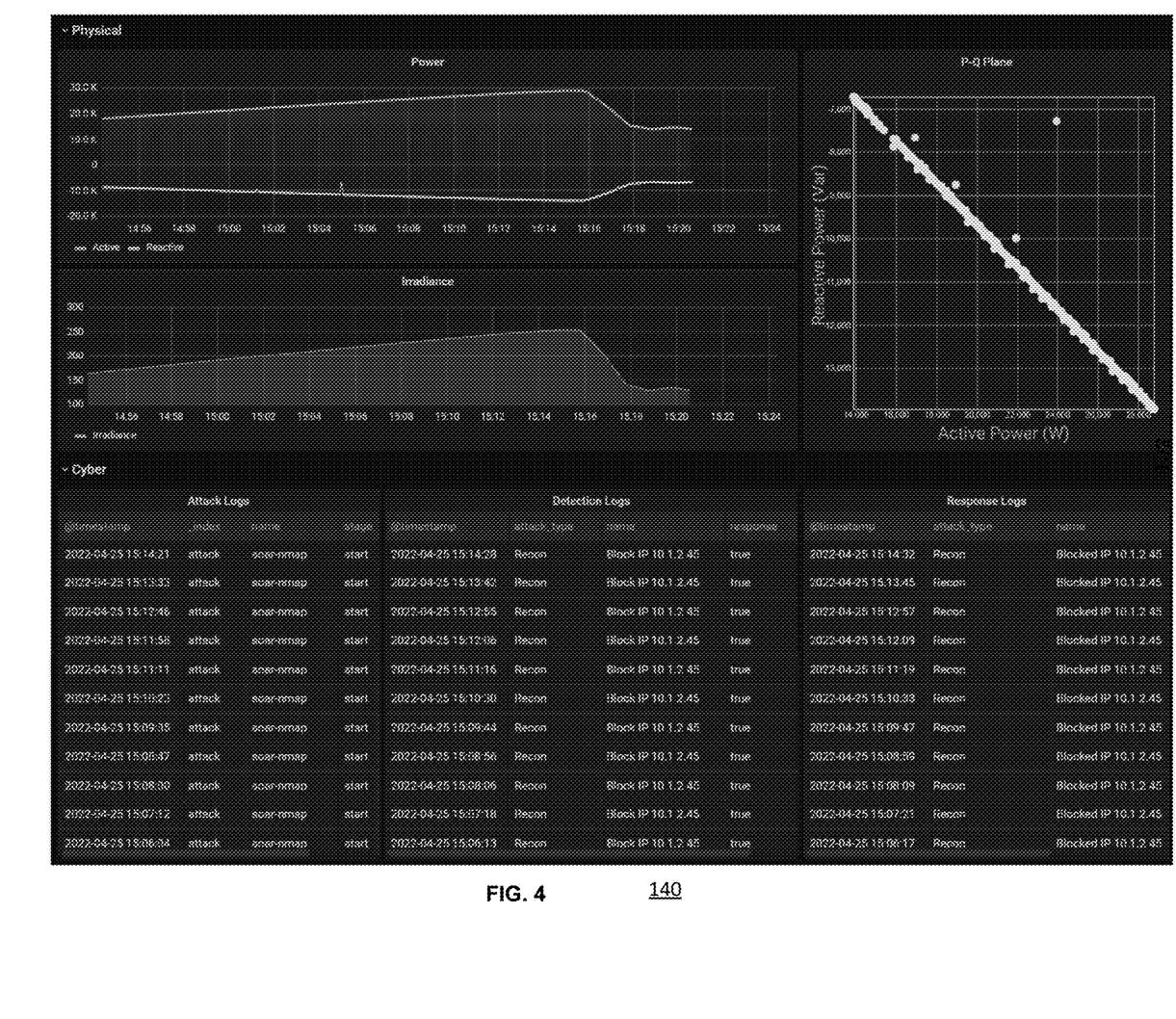
FIG. 4 is a diagram of a SOC dashboard with DER power data and SOAR detection and response timestamps according to various embodiments.

In the example shown in FIG. 4, the DER simulator 50D is configured to operate in constant power factor mode, as shown by the straight-line on the active power (P)-reactive power (Q) plane in the SIEM. While the test environment is a flat network, there would be no operational difference—aside from slightly longer communication times—for SOC systems 30 that were connected to a DER 10 site via SSH, VPN, or other means over the public internet, cellular connection, or radio mesh network.

In an embodiment, the SOAR simulation system 50A is built in a Debian virtual machine hosted on a Windows 10 computer. The SOAR simulation system 50A may consist of Python code that executes in a continuous 1 second loop over each of the playbooks (132A-132F shown in algorithm 130 of FIG. 3B). In the simulation each playbook queries Elasticsearch for data of interest from the last 30 seconds to determine if there were any new alerts or data indicating a compromise of the DER system 50D. If there is triggering data in Elasticsearch, the response playbook for that attack is executed. The SOAR loop time and the sliding window of Elasticsearch queries may be adjusted as desired in a simulated or actual operating environment. Such setting may provide reasonable response characteristics for the demonstration and possible operating environment in an embodiment.

Figure 3B:
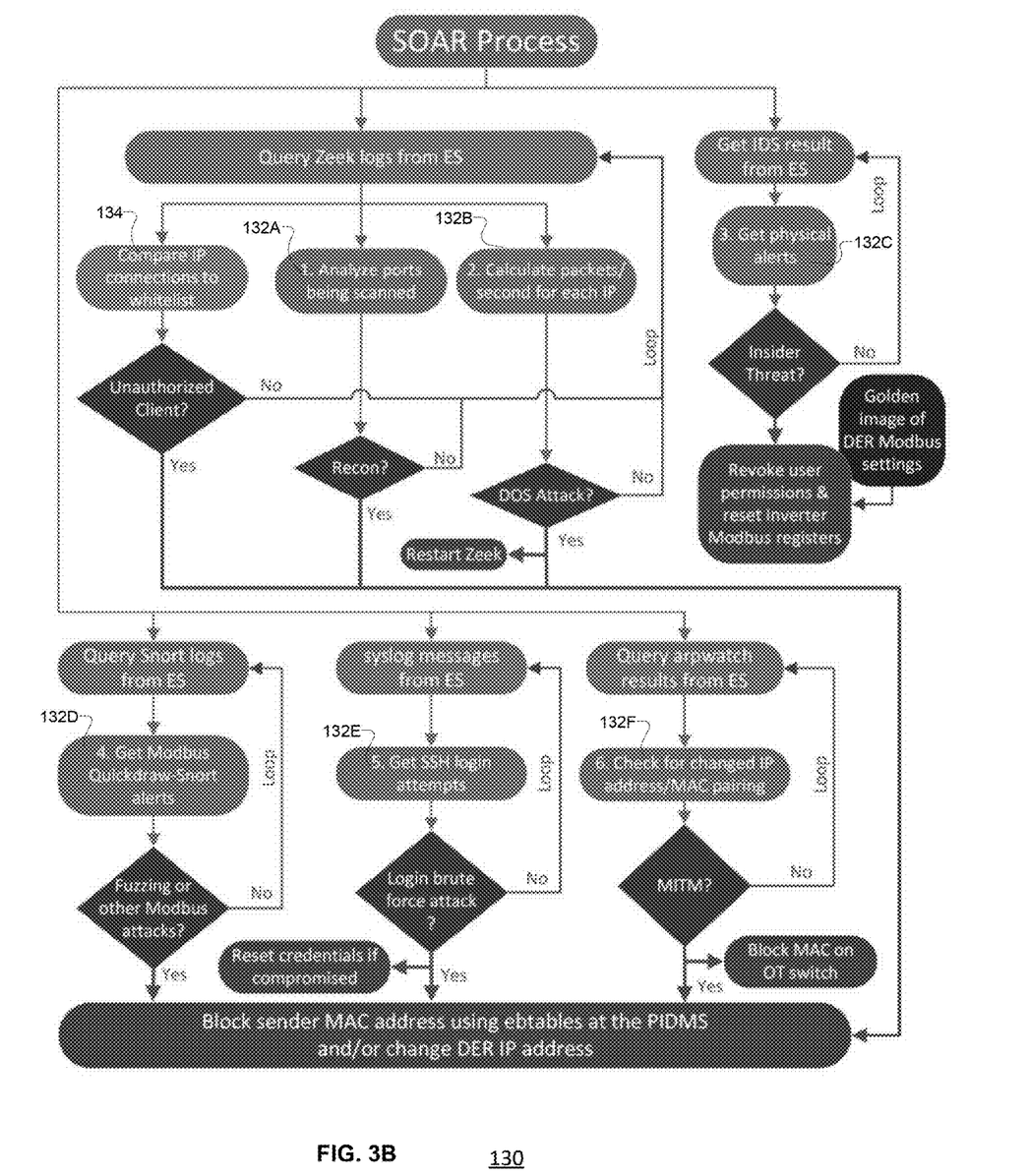
FIG. 3B is a block diagram of an algorithm for a SOAR4DER according to various embodiments.

As shown in FIG. 3B and noted, a SOAR system 36 may have a playbook having a number of plays, six (132A-132F) in an embodiment. The six plays for SOAR system 36 shown in FIG. 3B include:
1. Detecting reconnaissance using Zeek by analyzing all inbound connections to a PCDS/DER 10—132A;
2. Detecting denial-of-service attacks using Zeek logs of inbound connections to the PCDS/DER 10—132B;
3. Detecting insider threats or malicious PCDS/DER 10 reconfigurations by monitoring PCDS/DER operational/power data—132C;
4. Detecting fuzzing or other Modbus attacks by monitoring Quickdraw Snort rules—132D;
5. Detecting secure shell (SSH) brute force login attempts by monitoring PCDS/DER 10 syslog data—132E; and
6. Detecting Address Resolution Protocol (ARP) spoofing by monitoring the ethernet/IP address pairings with arpwatch—132F.

While 6 plays are presented, there are unlimited number of playbooks that may be developed using the base algorithm 110 show in FIG. 2. There are dozens of additional playbooks that could have been implemented. For example, the activity 134 in FIG. 3B compares inbound connections to a pre-approved whitelist and could be added as a playbook. Such an activity 134 may require more on-site maintenance to implement. In an embodiment, it may be advisable to allow all subnet IPs to connect to a PCDS/DER 10 to generate information to a SOC team about adversary tactics, techniques, and procedures as well as what IP address adversaries are using to perpetrate the attack. Each playbook attributes and emulated results are briefly discussed.

SOAR Playbook 1: Reconnaissance—There are many ways in which adversary reconnaissance may be detected. In an embodiment, recent Zeek logs are inspected to find any connections to closed port 23, which typically hosts Telnet services. Any valid DER users or tools will not be scanning DER port 23, and it can be assumed these devices are surveilling the network for targets. More sophisticated rules could easily be created as function of false positives or if the adversary scans different port lists. In an embodiment, training and applying behavior-based techniques may be employed to analyze traffic patterns that are capable of detecting port scans. In another embodiment, Software Defined Networking (SDN) could be leveraged to whitelist all valid communications (source, destination, physical/logical port) and drop all other traffic.

In the simulation, any attempted connection to port 23 is flagged as reconnaissance and the source IP is blocked at the IDS 20 using an ebtable rule where ebtables is a Linux-based tool for filtering Ethernet frames going through network bridges. When port 23 was scanned, Zeek logged this connection from an attacker IP, which was pulled by Filebeat and forwarded to Logstash for further processing and parsing and then saved as an entry in Elasticsearch. Meanwhile, the SOAR system was continuously looping through all the playbooks looking for triggering patterns in the Elasticsearch database.

Figure 6:
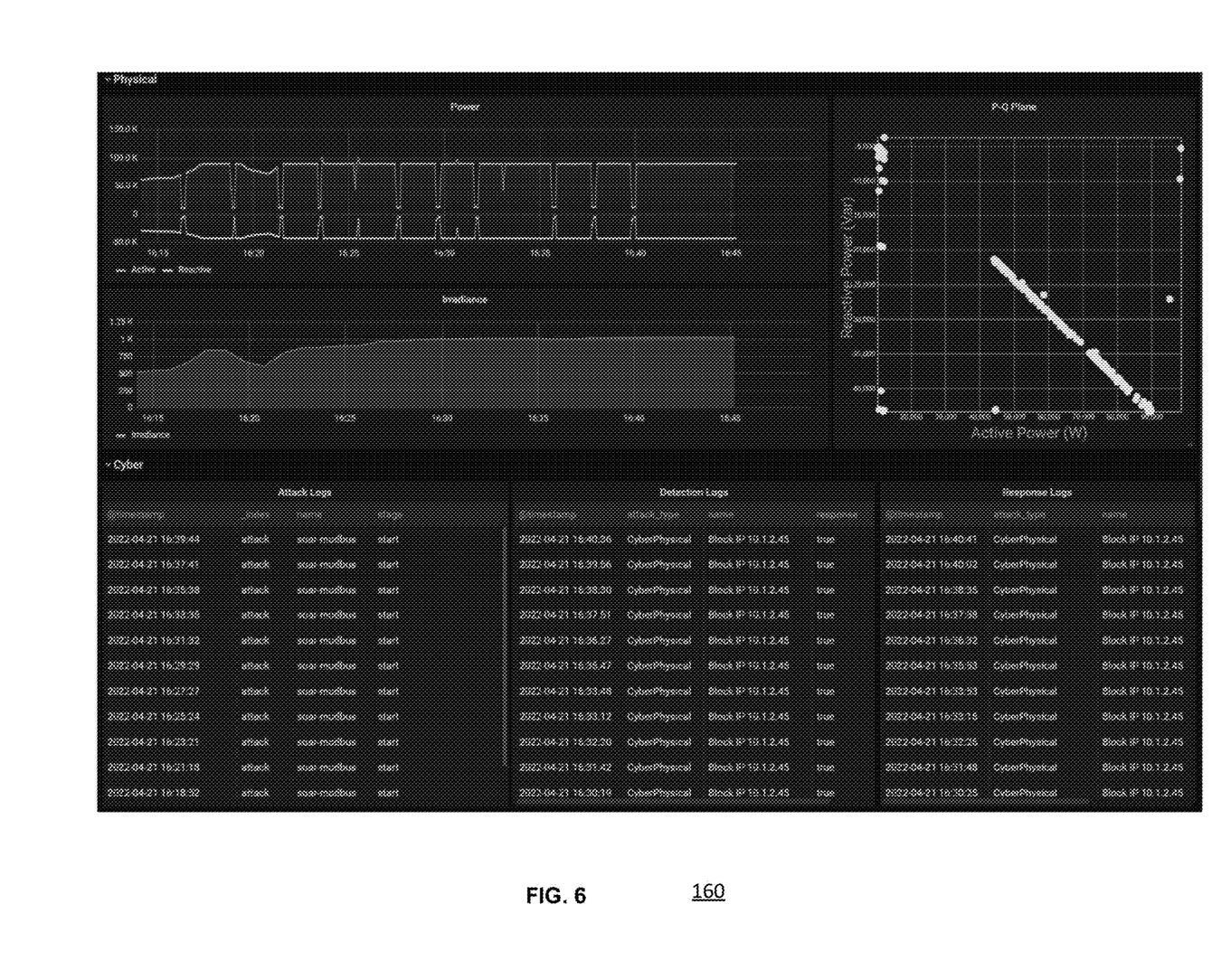
FIG. 6 is a diagram of a SOC dashboard with DER power data and SOAR detections and responses and DER changes in output power in the top plot timestamps according to various embodiments.

Once traffic to DER port 23 was detected in Elasticsearch, the reconnaissance playbook was triggered, which completed the following sequence: 1. The timestamp, source IP and port number, and destination IP and port number were recorded and reported to the user. 2. The SOAR system wrote an Elasticsearch detection log entry. 3. The IDS system is logged into using SSH and a new ebtable rule is created to block the attacker's IP located in the id orig host field. 4. The SOAR system writes to Elasticseach noting the response was completed using the attack system timestamp. 5. The SOAR slept for 30 seconds (the duration of collected Elasticsearch data) to prevent triggering a subsequent response for the same scan. 6. After conducting multiple, automated nmap scans on the DER device, the Grafana SIEM dashboard displayed physical DER data along with the attack, detection, and response data, as shown in the graph 160 of FIG. 6. Using the attacker and SOAR timestamps, the detection and response times were calculated for 10 reconnaissance attacks. The results show that the attacks took 2-3 seconds, and detection was 5-9 seconds, and the attacker IP was blocked 8-12 seconds after reconnaissance probes started.

SOAR Playbook 2: Denial-of-Service: Denial-of-Service (DOS) and Distributed Denial-of-Service (DDOS) attacks are relatively common because they are simple to execute, and botnets can be hired for this purpose. While few have targeted energy infrastructure, on Mar. 5, 2019, a renewable energy company, sPower, lost visibility to solar and wind installations for hours as a result of a DOS attack on an unpatched firewall. In a simulation, the attack machine flooded a port on a PCSD/DER 10 with packets containing 120 bytes of data each and the SYN flag set. Such an attack may be easy to detect because traffic drastically increases. Generally, based on the Elasticsearch logs, there is normally around 25-35 connections to the affected port in Zeek queries for the last 30 seconds.

These connections are primarily made by the IDS 20 to perform the physical data analysis. DERMS systems may also regularly query PCSD/DER 10 to get operational/power updates. The system determined the DOS attack rate using tcpdump was 36932 packets/sec for the attack machine 50E. In an embodiment, once the threshold is reached, the packet information is scanned for the source IP with the most packets and device blocked using an ebtable rule, as described in the reconnaissance playbook. During the simulation, the attacks took 5 seconds to execute but the attack harness operations-including writing Elasticsearch data twice-took between 6-9 seconds. DoS detection took 15-25 seconds, and the response took 18-28 seconds.

As with most of the playbooks, if reducing detection and response times is critical to the SOC team, a potentially faster approach would be to perform all the detection analytics and response actions on the IDS system locally in an embodiment. Such a configuration may eliminate the networking and SSH response latencies. After the response, the SIEM 34 could pull in the detection and response information to maintain situational awareness of the PCDS/DER 10 system.

SOAR Playbook 3: Insider Threat: It is possible PCDS/DER 10 configuration changes could be made accidentally or maliciously by an operator or insider at the utility or 3rd-party. For example, in a DER 10, there may be valid Modbus, IEEE 2030.5, IEEE 1815, or proprietary protocol writes to the DER 10 from a DERMS (DER management system). In such scenarios, it may be difficult to detect adversary action from cyber data alone. In an embodiment, a method to detect insider or configurations threats is to analyze the physical data for anomalies. For example, a photovoltaic (PV) site may be to be equipped with a plane-of-array pyranometer (irradiance sensor) that may be queried and used to validate the PV system's power output.

To collect this operational data, a script may be executed on a IDS 20 to pull/poll desired operational data (the power and irradiance data) via a bus (Modbus in an embodiment) from the DER 10 and pyranometer 54. To perform the physical analysis, a custom function may learn normal DER behavior, define the expected power output of the PV array. Training data and expected output function are shown in graph 150 of FIG. 5 where solar irradiance, G, in W/m2, is the x-axis and the active power, P, is the y-axis. The blue dots in FIG. 5 may be the measured values collected during a period of normal operations. During such period, the measured values follow a linear trend between about 50 W/m2 and 750 W/m2. After 750 W/m2, the PV array reached a maximum output and never exceeded 90 kW.

Figure 5:
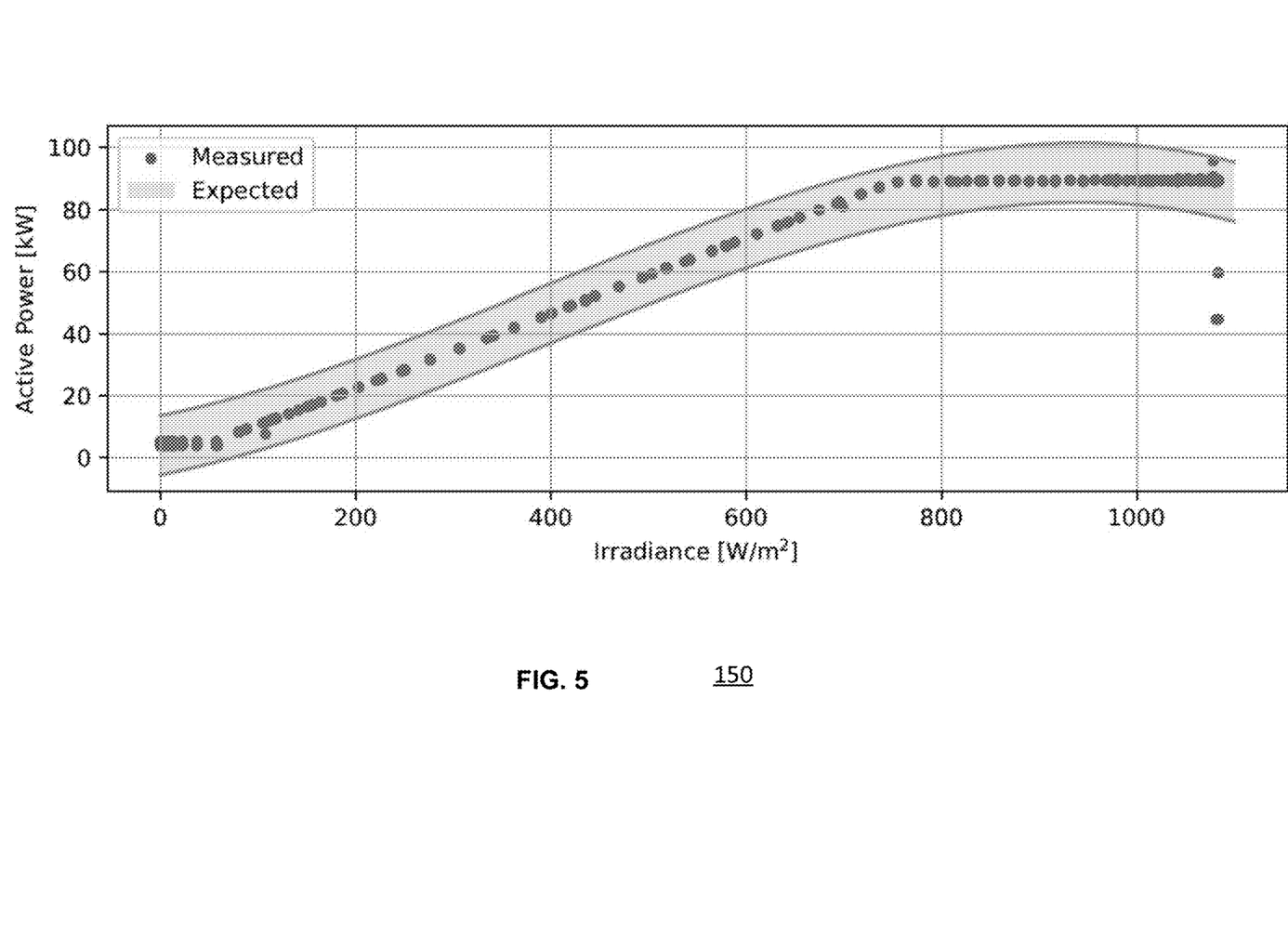
FIG. 5 is a diagram of a measured active power vs. solar irradiance with expected power output range of a PV system of a DER according to various embodiments.

The knees in the curve of FIG. 5 represent (a) the startup power requirement at low irradiance, and (b) DER operations with a constant 0.90 power factor when the device reaches its current limit at higher irradiance levels. The figure also shows two outliers at high irradiance which are not used in the expected outcome function. The expected outcome function, shown in FIG. 5 by the orange lines and shading, may be a polynomial function fit to the measured data. The range surrounding this function may be set to be plus or minus 10% of the maximum observed active power. This custom analysis may be performed at a desired interval (every 5 seconds in an embodiment) to classify performance as either normal or abnormal.

If performance is abnormal for more than two subsequent calculations, a message may be sent to the detection tool log database in Elasticsearch, which would trigger the SOAR playbook to address the insider threat. A SOAR system may revert DER control settings to a known-good "golden image" control state that is kept securely at the SOC. This golden image/configuration could be a set of default operating register values or the values from a previous, verified DER 10 update. In the case of a more sophisticated DER management scheme, there may be several golden images for the DER 10. Securing the golden image(s)/configurations may be paramount for the response to be effective.

After reverting the DER 10 control settings, the SOAR or SOC 30 personnel would inspect internal log data to find the user(s) who issued the DER changes and revoke their system credentials until their intentions (accidental vs malicious) can be determined. During testing insider threats, the attacks were completed in 3 seconds, detection was between 5-13 seconds, and response was completed in 10-18 seconds. In another embodiment, the SOAR 36 may compare settings to allowable ranges or the golden image to detect improper configuration changes. This inspection could be performed with deep packet inspection during Modbus (or other unencrypted protocol) setting changes or queried regularly from a DER 10.

SOAR Playbook 4: Modbus Malicious Writes or Fuzzing: Control engineers and DERMS platforms may know the correct Modbus holding registers to write for certain DER grid-support operations. Since these registers do not change for a given DER 10 firmware version once a DERMS is correctly configured, there should be no out-of-bounds register writes unless an adversary is attacking or fuzzing the system. Fuzzing is an approach of sending random data to a device to cause it to malfunction. This type of attack could be detected multiple ways including reading Modbus exception codes in the network traffic, DER HIDS alerts, or, through Snort Modbus rules from Digital Bond QuickDraw. QuickDraw is a set of ICS 20-specific Snort rules that generate alerts for multiple ICS protocols including Modbus and DNP3. The rules monitor traffic for attempted DOS attacks, malformed ICS packets, and ICS packets that have incorrect source and destination IP addresses.

When the holding register write is attempted, the Unauthorized Write Request rule may generate a Snort alert which is captured by Filebeat, sent to Logstash to transform the data to match the database schema, and logged to an Elasticsearch index with Snort identified as the source of the entry. Once the SOAR playbook observes an Unauthorized Write Request Snort log in Elasticsearch, it may parse the message to determine the source IP and block this IP at the IDS 20 using an ebtable rule. In an embodiment, an attack harness completed the attack in 3-4 seconds, the detection was completed in 14-20 seconds, and response was completed in 18-24. There are many additional Snort rules that could be adopted in an IDS 20 based on the protocols being used to communicate with the PCDS/DER 10.

SOAR Playbook 5: Brute Force Attacks: For PCDS/DER equipment or other computing systems at a PCDS/DER site, it may be possible to brute force HTTP, SSH, Telnet, remote desktop, or other logins using simple brute force, dictionary, password spraying, or credential spraying attacks. In many production DER devices and gateways, these services may be disabled, but in commercial and utility installations, there may be a jump host used for remote access to the site. In the jump host case, an additional IDS 20 may be used to monitor connections to the OT network. At DER sites where private keys or multi-factor authentication is absent and password hygiene is poor, brute force attacks could be highly effective.

In an embodiment, Filebeat and Logstash are added to the DER 10 to track failed authentication attempts in/var/log/auth.log and log them to Elasticsearch on the IDS 20. In an embodiment, such these attacks could also be detected on the BITW IDS 20 using Zeek and filtering on an appropriate port. If 5 or more failed logins are detected from a remote host within the last 30 seconds, the brute force playbook may be triggered. Once triggered, the rhost data is stripped from the Elasticsearch message and used to block the attacking system using the same technique from the other playbooks. In this case, the attack takes a significant time (73-112 seconds) and the detection and response are relatively quick at 7-13 seconds and 9-16 seconds. In an embodiment after a brute force attach, the DER SSH logs may be analyzed to see if there have been any successful logins from the attacking IP, and if so, that password may be changed enterprise-wide.

SOAR Playbook 6: Machine-in-the-Middle: Machine-in-the-Middle (MITM) attacks occur when an adversary reads or modifies data between two endpoints. One MITM method involves using Address Resolution Protocol (ARP) spoofing or ARP poisoning, wherein the attacker continuously broadcasts ARP messages that link the attacker's MAC address to the IP address of another host. If this broadcast is successful, a network switch may send traffic to the attacker as opposed to the legitimate destination. Once the attacker gets the data, they may read those messages or modify them before sending them on to the legitimate endpoint destination.

To detect such an attack, an IDS 20 may run arpalert to detect when an ARP table is modified. Once triggered, the SOAR system 36 blacklists the attacker IP at the IDS 20 and on any networking equipment (e.g., switches, firewalls, etc.) 52. In the simulation, attacks consistently took 15 seconds, but the attack harness required 18-19 seconds to complete. The detection time was 5-10 seconds and the response was 7-12 seconds.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A Security Orchestration, Automation, and Response (SOAR) system for a plurality of physically controlled distributed system (PCDS), including:
   a plurality of distributed Intrusion Detection Systems (IDS) in communication with the plurality of PCDS collecting cyber-physical data directed to or generated by the plurality of PCDS;
   one of or a combination of at least one of plurality of distributed IDS and a SOAR system analyzing the collected cyber-physical data;
   one of or a combination of the at least one of plurality of distributed IDS and the SOAR system employing at least one of a plurality of playbooks to detect one of a signature-based attack, a behavior-based attack, and a physical configuration attack on at least one of the plurality of PCDS based on the analyzed collected cyber-physical data; and
   one of the SOAR system or a combination of the at least one of plurality of distributed IDS and the SOAR system responding to the attack on the at least one of the plurality of PCDS by employing at least one of a plurality of playbooks.

2. The SOAR system of claim 1, further including the SOAR system reverting the affected one of the plurality of PCDS to a previous known good state of operation.

3. The SOAR system of claim 1, wherein one of plurality of distributed IDS is a Bump-in-the-Wire (BITW) system in communication with one of the plurality of PCDS and collects cyber-physical data directed to or generated by the one of the plurality of PCDS.

4. The SOAR system of claim 1, wherein the at least one of the plurality of attack playbooks is employed to detect a signature-based attack.

5. The SOAR system of claim 4, wherein the signature-based attack playbook detects one of identify packet manipulation and Address Resolution Protocol (ARP) spoofing.

6. The SOAR system of claim 1, wherein the at least one of the plurality of attack playbooks is employed to detect a behavior-based attack.

7. The SOAR system of claim 6, wherein the behavior-based attack playbook detects of one identifies adversary reconnaissance and denial-of-service attempts.

8. The SOAR system of claim 1, wherein the at least one of the plurality of attack playbooks detects a physical configuration attack.

9. The SOAR system of claim 8, further including the SOAR system reverting the affected at least one of the plurality of PCDS to a previous known good state of operation when one of the plurality of attack playbooks detects a physical configuration attack.

10. The SOAR system of claim 1, wherein one of the plurality of attack playbooks is employed to detect a signature-based attack, a second one of the plurality of attack playbooks is employed to detect a behavior-based attack, and a third one of the plurality of attack playbooks is employed to detect a physical configuration attack.

11. The SOAR system of claim 10, wherein the plurality of attack playbooks is employed to detect adversary reconnaissance, denial-of-service attacks, malicious Modbus commands, brute force logins, and machine-in-the-middle attacks.

12. The SOAR system of claim 10, wherein the plurality of PCDS are distributed energy resources (DER).

13. The SOAR system of claim 12, wherein each of the plurality of distributed Intrusion Detection Systems (IDS) is in communication with a particular one the plurality of DER and collects cyber-physical data directed to or generated by the particular DER.

14. The SOAR system of claim 13, wherein each of the plurality of distributed Intrusion Detection Systems (IDS) is a Bump-in-the-Wire (BITW) system.

15. The SOAR system of claim 11, wherein the plurality of distributed Intrusion Detection Systems (IDS) collects network traffic via various sniffers including Snort and Zeek.

16. The SOAR system of claim 15, wherein the plurality of distributed Intrusion Detection Systems (IDS) further conducts traffic analysis.

17. The SOAR system of claim 15, wherein the plurality of distributed Intrusion Detection Systems (IDS) further performs deep packet inspections.

18. The SOAR system of claim 16, wherein the plurality of distributed Intrusion Detection Systems (IDS) further creates signatures based on the traffic.

\* \* \* \* \*